(12) United States Patent
Roberts et al.

(10) Patent No.: US 6,872,462 B2
(45) Date of Patent: Mar. 29, 2005

(54) HIGH FREE SHRINK, HIGH MODULUS, LOW SHRINK TENSION FILM WITH ELASTIC RECOVERY

(75) Inventors: William P. Roberts, Spartanburg, SC (US); Ronald D. Moffitt, Chatham, VA (US); Richard M. Dayrit, Simpsonville, SC (US); Blaine C. Childress, Inman, SC (US); William J. Gauthier, Houston, TX (US); W. Scott Lambert, Moore, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 10/634,294

(22) Filed: Aug. 5, 2003

(65) Prior Publication Data

US 2004/0142195 A1 Jul. 22, 2004

(Under 37 CFR 1.47)

Related U.S. Application Data

(60) Provisional application No. 60/401,066, filed on Aug. 5, 2002.

(51) Int. Cl.$^7$ ............................................ B32B 27/32
(52) U.S. Cl. ..................... 428/516; 428/213; 428/515; 428/520
(58) Field of Search .................... 525/240; 428/516, 428/515, 520, 213

(56) References Cited

U.S. PATENT DOCUMENTS

| | | |
|---|---|---|
| 4,501,634 A | 2/1985 | Yoshimura et al. |
| 4,820,590 A | 4/1989 | Hodgson, Jr. et al. |
| 4,863,784 A | 9/1989 | Lustig et al. |
| 4,963,419 A | 10/1990 | Lustig et al. |
| 5,023,143 A | 6/1991 | Nelson |
| 5,059,481 A | 10/1991 | Lustig et al. |

(Continued)

FOREIGN PATENT DOCUMENTS

| | | | |
|---|---|---|---|
| EP | 0 120 562 A2 | * | 10/1984 |
| EP | 0 229 715 B1 | | 5/1992 |
| EP | 0 773 102 A1 | | 5/1997 |
| EP | 1 300 238 A2 | * | 4/2003 |
| JP | 5-262899 | | 10/1993 |
| JP | 8-165357 | | 6/1996 |
| JP | 08-165357 | * | 6/1996 |
| JP | 8-267679 | | 10/1996 |
| WO | 94/17113 | | 8/1994 |

OTHER PUBLICATIONS

J. Schut, "Materials Close Up: New Cyclic Olefins Are Clearly Worth a Look," Plastics Technology (Mar. 2000).

A. Weinberg, "A Decade of the Good Stuff: Packaging Applications Enabled by Metallocene Resins" presentation at the American Chemical Society meeting, Apr. 7–11, 2002 at Orlando, Florida.

(Continued)

*Primary Examiner*—D. Lawrence Tarazano

(57) ABSTRACT

A film includes a core layer including a homogeneous random alpha-olefin/cyclic olefin copolymer; and first and second outer layers including an olefinic polymer; the film having Young's modulus between about 50,000 and about 200,000 psi, free shrink between about 10% and about 80% at 240° F., and shrink tension of less than about 400 psi, or a shrink force of between about 20 and about 180 grams, at 240° F. First and second intermediate layers including an ethylene copolymer having a melt index less than about 2 g/10 minutes can be optionally included. Alternatively, a film includes a core layer including an ethylene copolymer having melt index less than about 2 g/10 minutes; first and second intermediate layers including a homogeneous random alpha-olefin/cyclic olefin copolymer; and first and second outer layers including an olefinic polymer; the film having properties as disclosed above.

47 Claims, 1 Drawing Sheet

U.S. PATENT DOCUMENTS

| | | | |
|---|---|---|---|
| 5,252,385 A | | 10/1993 | Kagawa et al. |
| 5,256,428 A | | 10/1993 | Lustig et al. |
| 5,273,797 A | | 12/1993 | Hazelton et al. |
| 5,300,353 A | | 4/1994 | Yoshimura et al. |
| 5,346,644 A | | 9/1994 | Speer et al. |
| 5,439,717 A | | 8/1995 | Lustig et al. |
| 5,462,807 A | | 10/1995 | Halle et al. |
| 5,492,741 A | | 2/1996 | Akao et al. |
| 5,529,833 A | | 6/1996 | Speer et al. |
| 5,561,208 A | * | 10/1996 | Takahashi et al. .......... 526/281 |
| 5,583,192 A | | 12/1996 | Bennett et al. |
| 5,629,398 A | | 5/1997 | Okamoto et al. |
| 5,648,020 A | | 7/1997 | Speer et al. |
| 5,648,443 A | | 7/1997 | Okamoto et al. |
| 5,658,625 A | | 8/1997 | Bradfute et al. |
| 5,700,554 A | | 12/1997 | Speer et al. |
| 5,723,545 A | | 3/1998 | Harrington et al. |
| 5,837,787 A | | 11/1998 | Harrington |
| 5,846,620 A | * | 12/1998 | Compton ................... 428/35.7 |
| 5,993,922 A | | 11/1999 | Babrowicz et al. |
| 6,030,255 A | * | 2/2000 | Konishi et al. ............. 439/578 |
| 6,165,573 A | * | 12/2000 | Hirose et al. .............. 428/36.6 |
| 6,310,160 B1 | * | 10/2001 | Kodemura ................. 526/281 |
| 6,479,138 B1 | | 11/2002 | Childress |
| 6,767,966 B2 | * | 7/2004 | Berger et al. ............... 525/216 |
| 2003/0170479 A1 | * | 9/2003 | Peiffer et al. .............. 428/515 |
| 2004/0067382 A1 | * | 4/2004 | Niepelt ...................... 428/515 |
| 2004/0142195 A1 | * | 7/2004 | Roberts et al. ............. 428/515 |

OTHER PUBLICATIONS

J. Schut, "Close–Up: Materials New Cyclic Olefins," Plastics Technology (Mar. 2000).

"Ticona's TOPAS® COC Selected for Hefty® Slide–Rite® Closure Systems to Gain Stiffness, Strength and Straightness in Packaging Bags," Pactiv/Ticona/Celanese Press Release (Oct. 23, 2001).

D. McNally, "Cyclic Olefin Copolymer," Modern Plastics 2001 World Encyclopedia, p. B–+ (2001).

Ticona Product Brochure, "Product–Portfolio, High–Performance Polymeres for Innovative Applications," Europe (Apr. 2000).

R.R. Lamonte et al, "Uses and Processing of Cyclic Olefin Copolymers (COC)," Plastic Engineering, vol. 56, No. 6, p. 51ff+ (Jun. 2000).

Ticona Product Brochure, "Topas®, Thermoplastic Olefin Polymer of Amorphous Structure (COC)," pp. 1–20 (Aug. 2000).

Celanese Product Brochure, "Engineering Polymers for Innovative Applications," pp 1–17 (Jan. 2000).

T. Weller, "Topas Prepares for Take Off; The Cyclo Story," Germany New Plastics (based on paper presented at the European Plastics News, New Plastics 1998 Conference) (Jun. 1998).

Ticona, "Application Story, Topas® Cyclic Olefin Copolymer, . . . Multilayer Film" (Jun. 2001).

Ticona, "Flexible Packaging, Topas® Cycic Olefin Copolymer" (Jan. 2000).

Ticona, "Application Story, Topas® Cyclic Olefin Copolymer, . . . Novel Lidding Stock" (Sep. 2001).

\* cited by examiner

HIGH FREE SHRINK, HIGH MODULUS, LOW SHRINK TENSION FILM WITH ELASTIC RECOVERY

This application claims priority from and the benefit of U.S. Provisional Patent Application Ser. No. 60/401,066 filed Aug. 5, 2002, which is incorporated herein in its entirety by reference.

BACKGROUND OF THE INVENTION

1. Field of the Invention

The present invention relates to an oriented, heat shrinkable thermoplastic film.

2. Description of Background and Other Information

"Soft shrink" films are known in the art. These films offer relatively high free shrink combined with relatively low shrink tension. Films thusly characterized by relatively high free shrink and relatively low shrink tension are suitable for packaging articles, such as textiles and paper, that are sensitive to, or whose packaged appearance suffers from effects, such as distortion, of a film with too high a shrink tension.

An example of the soft shrink films is poly(vinyl chloride) (hereinafter "PVC") film. PVC film exhibits good elastic recovery, high modulus, and low shrink tension. Unfortunately, PVC film suffers from poor sealability, low free shrink, and poor tear resistance. It also carbonizes during a heat sealing process, releasing hydrogen chloride. The ensuing hydrochloric acid attacks and corrodes metal surfaces of equipment.

It would be desirable to provide a chlorine-free film that avoids the disadvantages of PVC film, but offers relatively high modulus and good elastic recovery, while maintaining good heat seal quality, high free shrink, and a low shrink tension. Additionally, it would be advantageous to provide such attributes in a chlorine-free film having good optical quality (low haze) and elastic recovery.

SUMMARY OF THE INVENTION

In a first aspect, a multilayer solid state oriented heat shrink film comprises at least one core layer comprising a homogeneous random alpha-olefin/cyclic olefin copolymer; and a first and second outer layer each comprising an olefinic polymer; wherein the film has a Young's modulus of from about 50,000 to about 200,000 pounds per square inch in at least one of the longitudinal and transverse directions; a free shrink of at least about 10% at 240° F. in at least one of the longitudinal and transverse directions; and a shrink tension of less than about 400 pounds per square inch, or a shrink force of between about 20 and about 180 grams, at 240° F. in at least one of the longitudinal and transverse directions.

In a second aspect, a multilayer solid state oriented heat shrinkable film comprises at least one core layer comprising a homogeneous random alpha-olefin/cyclic olefin copolymer; a first and second intermediate layer each comprising an ethylene copolymer, or another copolymer, having a melt index less than about 2 g/10 minutes; and a first and second outer layer each comprising an olefinic polymer; wherein the film has a Young's modulus of from about 50,000 to about 200,000 pounds per square inch in at least one of the longitudinal and transverse directions; a free shrink of at least about 10% at 240° F. in at least one of the longitudinal and transverse directions; and a shrink tension of less than about 400 pounds per square inch, or a shrink force of between about 20 and about 180 grams, at 240° F. in at least one of the longitudinal and transverse directions.

In a third aspect, a multilayer solid state oriented heat shrinkable film comprises a at least one core layer comprising an ethylene copolymer, or another polyolefin, having a melt index less than about 2 g/10 minutes; a first and second intermediate layer each comprising a homogeneous random alpha-olefin/cyclic olefin copolymer; and a first and second outer layer each comprising an olefinic polymer; wherein the film has a Young's modulus of from about 50,000 to about 200,000 pounds per square inch in at least one of the longitudinal and transverse directions; a free shrink of at least about 10% at 240° F. in at least one of the longitudinal direction and transverse directions; and a shrink tension of less than about 400 pounds per square inch, or a shrink force of between 20 and 180 grams, at 240° F. in at least one of the longitudinal and transverse directions.

In a fourth aspect, a method of making a film comprises coextruding a molten sheet of film comprising at least one core layer comprising a homogeneous random alpha-olefin/cyclic olefin copolymer; and a first and second outer layer each comprising an olefinic polymer; quenching the extruded molten sheet of film to its solid state; reheating the quenched solid-state sheet of film to its orientation temperature; stretching the reheated sheet of film to produce an oriented film; and rapidly cooling the oriented sheet of film to below its orientation temperature, while maintaining the film in its stretched configuration, to produce a heat shrinkable film, the film having a Young's modulus of from about 50,000 to about 200,000 pounds per square inch in at least one of the longitudinal and transverse directions; a free shrink of at least about 10% at 240° F. in at least one of the longitudinal and transverse directions; and a shrink tension of less than about 400 pounds per square inch, or a shrink force of between 20 and 180 grams, at 240° F. in at least one of the longitudinal and transverse directions.

In a fifth aspect, a method of making a film comprises coextruding a molten sheet of film comprising at least one core layer comprising a homogeneous random alpha-olefin/cyclic olefin copolymer; a first and second intermediate layer each comprising an ethylene copolymer, or another polyolefin, having a melt index less than about 2 g/10 minutes; and a first and second outer layer each comprising an olefinic polymer; quenching the extruded molten sheet of film to its solid state; reheating the quenched solid-state sheet of film to its orientation temperature; stretching the reheated sheet of film to produce an oriented film; and rapidly cooling the oriented sheet of film to below its orientation temperature, while maintaining the film in its stretched configuration, to produce a heat shrinkable film, the film having a Young's modulus of between about 50,000 and about 200,000 pounds per square inch in at least one of the longitudinal and transverse directions; a free shrink of at least about 10% at 240° F. in at least one of the longitudinal and transverse directions; and a shrink tension of less than about 400 pounds per square inch, or a shrink force of between 20 and 180 grams, at 240° F. in at least one of the longitudinal and transverse directions.

In a sixth aspect, a method of making a film comprises coextruding a molten sheet of film comprising at least one core layer comprising an ethylene copolymer, or another polyolefin, having a melt index less than about 2 g/10 minutes; a first and second intermediate layer each comprising homogeneous random alpha-olefin/cyclic olefin copolymer; and a first and second outer layer each comprising an olefinic polymer; quenching the extruded molten sheet of film to its solid state; reheating the quenched solid-state sheet of film to its orientation temperature; stretching the reheated sheet of film to produce an oriented film; and rapidly cooling the oriented sheet of film to below its orientation temperature, while maintaining the film in its stretched configuration, to produce a heat shrinkable film, the film having a Young's modulus of between about 50,000 and about 200,000 pounds per square inch in at least one of the longitudinal and transverse directions; a free shrink of at least about 10% at 240° F. in at least one of the longitudinal and transverse directions; and a shrink tension of less than about 400 pounds per square inch, or a shrink force of between about 20 and about 180 grams, at 240° F. in at least one of the longitudinal and transverse directions.

In any of the foregoing aspects, preferably the alpha-olefincyclic olefin copolymer comprises at least 65 percent by weight of the layer or layers wherein it resides. Also as a matter of preference, in any of the six indicated aspects, the film may have a haze value of less than 6.

In any of the above-disclosed methods, preferably the orientation temperature—to which the film sheet is reheated—is at least about 20° C. greater than the glass transition temperature of the alpha-olefin/cyclic olefin copolymer. More preferably, this temperature is at least about 40° C. greater than the alpha-olefin/cyclic olefin copolymer's glass transition temperature.

Additionally, the quenched extruded sheet of film can optionally be irradiated before the reheating step.

Yet further, the reheated sheet of film can be biaxially oriented by e.g. trapped bubble orientation or tenter frame orientation.

Definitions

"Alpha-olefin" herein refers to olefinic compounds, whether unsubstituted or substituted, in which the first two carbon atoms in the chain have a double bond therebetween. Examples include ethylene, propylene, hexene, and octene.

"Alpha-olefin/cyclic olefin copolymer" (AO/CO) herein refers to copolymers made from monomers comprising an alpha-olefinic monomer having from two to eight carbon atoms per molecule, and an aliphatic cyclic olefinic monomer. Although the present description primarily focuses on olefin/cyclic olefin copolymers, terpolymers are also within the scope of such term. The alpha-olefin/cyclic olefin copolymers can be prepared by processes as are known in the art, such as those disclosed in U.S. Pat. No. 5,837,787 (Harrington) and U.S. Pat. No. 5,993,922 (Babrowicz et al.); these patents are incorporated herein in their entireties, by reference thereto. Alpha-olefin/cyclic olefin copolymers typically are homogeneous linear random alpha-olefin/cyclic olefin copolymers, and typically are prepared using single-site catalysts, especially using metallocene catalysts such as bis (cyclopentdienyl) zirconium dichloride bis (indenyl) zirconium dichloride.

"Core layer" herein refers to an internal layer of a multilayer film, i.e. a layer bounded on both of its major surfaces by another layer or layers; in a film with an odd number of total layers, the core layer is typically the central layer of the film.

"Comp. Ex.", herein refers to "Comparative Example". "Ex." herein refers to an example of the invention.

"Cyclic olefin", herein refers to aliphatic cycloalkenes. Cyclic olefin comprises monocyclo, bicyclo and tricyclo alkenes. Preferred cyclic olefins include norbornene, substituted norbornenes, cyclopropene, cyclo-butene, cyclopentene, methylcyclopentene, vinylcyclohexene, 5-vinylnorbornene, 5-methylnorbornene, 5-ethylidene-norbornene, 2-adamantylidene, 2-vinyl adamantane, and tetra-cyclododecene. Of these, norbornene is preferred.

"Ethylene/alpha-olefin copolymer" (EAO) herein refers to a copolymer of ethylene with one or more aliphatic comonomers selected from $C_3$ to $C_{10}$ alpha-olefins such as propene, butene-1, hexene-1, octene-1, etc. in which the molecules of the copolymers assemble as long polymer chains with relatively few short chain branches arising from the alpha-olefin which was reacted with ethylene. This molecular structure is to be contrasted with conventional high pressure low density (LDPE) or medium density polyethylenes which are highly branched homopolymers and contain both long chain and short chain branches. EAO includes such heterogeneous materials, particularly such heterogeneous polymers, as linear medium density polyethylene (LMDPE), linear low density polyethylene (LLDPE), and very low and ultra low density polyethylene (VLDPE and ULDPE), such as DOWLEX™ or ATTANE™ resins supplied by Dow, and ESCORENE™ resins supplied by Exxon.

"Free Shrink" values herein are in accordance with ASTM D 2732-83. This test method is incorporated herein in its entirety, by reference thereto.

"Glass transition temperature" ($T_g$) is determined by Differential Scanning Calorimetry (DSC) at 10° C. per minute.

"Haze" is a measurement of the transmitted light scattered more than 2.5° from the axis of the incident light, and is measured against the outside surface of the film according to ASTM D 1003. This test method is incorporated herein in its entirety, by reference thereto.

"Homogeneous ethylene/alpha olefin copolymer" (HEAO) herein refers to polymerization reaction products of narrow molecular weight distribution ($M_w/M_n$ less than 3) and narrow composition distribution, referred to as to single-site polymerized polymers. These include linear homogeneous ethylene/alpha olefin copolymers (linHEAO) such as TAFMER™ resins supplied by Mitsui Petrochemical Corporation, EXACT™ resins supplied by Exxon, as well as long chain branched (lcbHEAO) AFFINITY™ resins supplied by the Dow Chemical Company, or ENGAGE™ resins supplied by DuPont Dow Elastomers. Homogeneous EAO copolymers may be polymerized using vanadium catalysts, as in the case of the TAFMER™ products, or may employ a metallocene catalyst as in the case of the more recent EXACT™, EXCEED™, ELITE™, or AFFINITY™ products. Homogeneous EAO copolymers may also be prepared using the DuPont Versipol™ catalysts or the Eastman Chemical Gavilan™ catalysts.

"Heterogeneous" polymers herein refers to polymerization reaction products of relatively broad molecular weight and relatively wide composition distribution, such as VLDPE, LLDPE.

"High density polyethylene" (HDPE) herein refers to a polyethylene having a density of between 0.94 and 0.965 grams per cubic centimeter.

"Intermediate layer" herein refers to a layer of a multilayer film which is between an outer layer and the at least one core layer of the film.

"Interpolymer" herein refers to polymers assembled using two or more different monomers, and includes copolymers, terpolymers, tetrapolymers, etc. (for example, ethylene/norbornene interpolymer) The term may be used alternatively with the synonym "copolymer".

"Lamination", "laminated sheet", and the like refer herein to the process, and resulting product, made by bonding together two or more layers of film or other materials.

Lamination can be accomplished by joining layers with adhesives, joining with heat and pressure, and even spread coating and extrusion coating. The term laminate as used herein is also inclusive of coextruded multilayer films comprising one or more tie layers.

"LD" herein refers to the longitudinal direction, i.e. the direction of the film parallel to the path of extrusion. "TD" herein refer to the transverse direction, i.e. the direction of the film transverse to the path of extrusion.

"Linear low density polyethylene" (LLDPE) herein refers to polyethylene having a density between 0.916 and 0.925 grams per cubic centimeter.

"Linear medium density polyethylene" (LMDPE) herein refers to polyethylene having a density between 0.926 and 0.939 grams per cubic centimeter.

"Melt index" or "melt flow index" herein is with reference to ASTM D 1238-90, Condition 190° C./2.16 Kg. This test method is incorporated herein in its entirety, by reference thereto.

"Multicomponent ethylene/alpha-olefin inter-penetrating network resin" or "IPN resin" herein refers to multicomponent molecular mixtures of polymer chains that are interlaced at a molecular level and are thus true solid state solutions. These become new compositions exhibiting properties distinct from parent constituents. IPN resins provide phase co-continuity leading to enhancement of physical properties, and may exhibit bimodal or multimodal curves when analyzed using TREF or CRYSTAF.

"IPN resins" includes semi-interpenetrating networks including crosslinked and uncrosslinked multicomponent molecular mixtures having a low density fraction and a high density fraction. Examples of IPN resins include ELITE™ resins from Dow.

"Outer layer" herein refers to what is typically an outermost, usually surface layer or skin layer of a multilayer film, although additional layers, coatings, and/or films can be adhered to it.

"Polymer" herein refers to homopolymer, copolymer, terpolymer, tetrapolymer, etc. "Copolymer" herein includes bipolymer, terpolymer, tetrapolymer, etc.

"Polyolefin" herein includes homopolymers, copolymers, and terpolymers produced by addition of one or more olefin monomers. Among the polyolefins are low density polyethylenes (LDPE), polybutenes, and ethylene/vinyl acetate copolymers.

"Shrink Tension" and "Shrink Force" herein refer to a force exerted by a one inch strip of film as a result of heat shrinking at a specified temperature. Testing is conducted according to ASTM 2838—this test method being incorporated herein in its entirety, by reference thereto—with variations for Examples 1–8 and Comparative Examples 1–7, as discussed herein.

A 2.8 inch by 1 inch test strip (2.8 inches is the distance between the jaws of the strain gauge) is immersed in an oil bath (Dow Corning 200 silicone oil, 20 centistroke) preheated to 100° F. [38° C.] which is thereafter heated at a rate of approximately 10° F. per minute to about 300° F., or to the melting point of the specimen, while restraining the immersed specimen in the jaws of a strain gauge. Strain force is measured continuously and reported at 10° increments and converted to psi by use of the initial thickness of the one-inch test strip.

"Solid-state oriented" herein refers to films obtained by either co-extrusion or extrusion coating of the resins of different layers to obtain a primary thick sheet or tube (primary tape) that is quickly cooled to a solid state to quench (stop) crystallization of the polymers, thereby providing a solid primary film sheet. The primary sheet is then reheated to the so-called orientation temperature, and thereafter biaxially stretched at the orientation temperature using either a tubular solid-state orientation process (for example a trapped bubble method) or using a flat solid-state orientation process (for example a simultaneous or sequential tenter frame), and finally rapidly cooled below the orientation temperature to provide a heat shrinkable film. In the trapped bubble solid-state orientation process, the primary tape is stretched in the transverse direction (TD) by passing over an air bubble which is held between two rotating nip rolls, as well as stretched in the longitudinal direction (LD) by the differential speed between the two sets of nip rolls that contain the bubble. In the tenter frame process, the sheet or primary tape is stretched in the longitudinal direction by accelerating the sheet forward, while simultaneously or sequentially accelerating the sheet in the transverse direction by guiding the heat softened sheet through a diverging geometry frame. This tenter process typically refers to a flat sheet of relatively thick film. Solid state oriented films exhibit high free shrink when reheated to the orientation temperature of the film, as contrasted to simple blown films which are oriented directly out of the melt state, and which shrink at or near the melting point of the film.

"Young's modulus" or "modulus" values herein are in accordance with ASTM D 882. This test method is incorporated herein in its entirety, by reference thereto.

Unless stated otherwise, all percentages, parts, etc. are by weight. Particularly, all compositional percentages, including monomer percentages, used herein are presented on a "by weight" basis, unless designated otherwise. All film and sheet thicknesses designated in percentages are by percentage of total thickness of the film or sheet.

BRIEF DESCRIPTION OF THE DRAWINGS

A detailed description of embodiments of the invention follows, with reference to the attached drawings, wherein.

DESCRIPTION OF THE INVENTION

Figure 1:
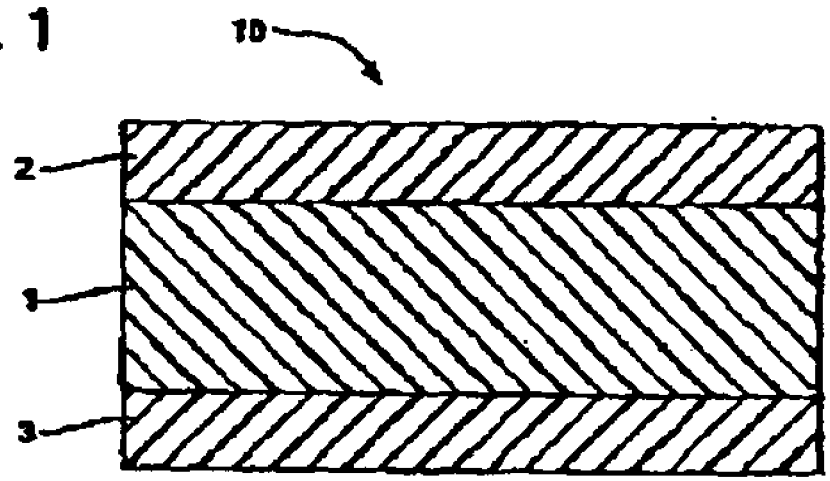
FIG. 1 is a cross-sectional view of a three layer film.

Films of the invention can be made by any suitable process, such as extrusion, coextrusion, lamination, or extrusion coating; however, coextrusion is preferred, as is solid state orientation. Following extrusion, a thick, precursor film is cooled to a solid state by, for example, cascading water, chilled water bath, chilled metal roller, or chilled air quenching. For some structures a precursor film layer or layers may be formed by extrusion with additional layers thereafter being extrusion coated thereon to form multilayer films. Multilayer tubes may also be formed with one of the tubes thereafter being coated or extrusion laminated onto the other. Solid state precursor films are reheated to the films orientation temperature by, for example contact with steam heated metal cans, hot air or infrared ovens. Heated precursor films are stretched into oriented films using for example trapped bubble or tenter frame, and thereafter rapidly cooled while holding the oriented film in a highly stretched configuration to produce a heat shrinkable film.

Films of the invention are preferably subjected to an energetic radiation treatment, including, but not limited to corona discharge, plasma, flame, ultraviolet, and high energy electron treatment. Irradiation with ultraviolet or high energy electron treatment may be carried out in such a manner as to produce a crosslinked polymer network. Irradiation can be performed prior to or after any orientation step. Electronic radiation dosages, by e.g. electron beam irradiation, can be between about 10 and about 200 kiloGray, such as between about 15 and about 150 kiloGray, or between about 20 and about 150 kiloGray, or between about 20 and about 100 kiloGray, or between about 3 and about 20 megarad. Alternatively, crosslinking can be accomplished by chemical means.

The AO/CO comprises an alpha-olefin and a cyclic olefin. Alpha-olefin/cyclic olefin copolymers of the invention preferably are amorphous alpha-olefin/cyclic olefin copolymers, and/or homogeneous random alpha-olefin/cyclic olefin copolymers.

The preferred alpha-olefin is ethylene. Suitable cyclic olefins include cyclopentene and substituted cyclopentenes. Also suitable are the products of Diels-Alder cycloadditions of cyclopentadiene to an olefin; particularly, norbornene and substituted norbornenes may be used. Specific cyclic olefins useful in carrying out the invention include norbornene, substituted norbornenes, cyclopropene, cyclobutene, cyclopentene, methylcyclopentene, vinylcyclohexene, 5-vinylnorbornene, 5-methylnorbornene, 5-ethylidenenorbornene, 2-adamantylidene, 2-vinyl adamantane, and tetracyclododecene.

Preferred alpha-olefin/cyclic olefin copolymers are the ethylene/norbornene copolymers and the ethylene/cyclopentene copolymers, particularly the amorphous ethylene/norbornene copolymers and ethylene/cyclopentene copolymers, and/or the homogeneous random ethylene/norbornene copolymers and ethylene/cyclopentene copolymers. In the case of the ethylene/norbornene copolymers, preferably the norbornene comprises from about 15 mole percent to about 30 mole percent, or from about 15 mole percent to about 24 mole percent, or from about 15 mole percent to about 28 mole percent, or from about 18 mole percent to about 28 mole percent, or from about 18 mole percent to about 24 mole percent, or from about 20 mole percent to about 24 mole percent, or from about 22 mole percent to about 23 mole percent. Mole percent is measured by $^{13}$C NMR analysis.

In the case of the ethylene/cyclopentene copolymers, preferably the cyclopentene comprises from about 75 weight percent to about 95 weight percent of the polymer.

Also as a matter of preference, the alpha-olefin/cyclic olefin copolymers of the invention may have a glass transition temperature of from about 25° C. to about 50° C., or from about 25° C. to about 45° C., or from about 30° C. to about 50° C., or from about 30° C. to about 45° C., or from about 30° C. to about 40° C., or from about 35° C. to about 50° C., or from about 35° C. to about 45° C., or from about 35° C. to about 40° C.; more preferably, the alpha-olefin/cyclic olefin copolymers of the invention may have a glass transition temperature of from about 28° C. to about 40° C., such as from about 30° C. to about 35° C. Particularly preferred are the ethylene/norbornene copolymers and the ethylene/cyclopentene copolymers having glass transition temperatures of from about 28° C. to about 40° C.

With the alpha-olefin/cyclic olefin copolymer $T_g$ at about 45° C. or less, film processing is improved, especially where the trapped bubble process is employed for orientation. Having a $T_g$ upper limit of about 45° C. provides a tougher film, and leads to lower shrink tensions and superior elastic recovery. Similarly, with the alpha-olefin/cyclic olefin copolymer $T_g$ above about 25° C., the film exhibits desired higher modulus. Further, modulus may be modified, to an extent, depending upon the types and amounts of poyolefins incorporated in layers other than the AO/CO layer or layers.

Yet additionally as a matter of preference, the alpha-olefin/cyclic olefin copolymers of the invention may have a weight average molecular weight ($M_w$) of from about 30,000 Daltons to about 1,000,000 Daltons, more preferably from about 60,000 Daltons to about 300,000 Daltons. Still further, the AO/CO resin preferably has a molecular weight distribution (Mw/Mn) less than about 4, more preferably less than about 3, still more preferably from about 1.2 to 2.5.

Suitable AO/CO terpolymers include ethylene/norbornene/octene, ethylene/norbornene/butene, propylene/norbornene/ethylene, and ethylene/norbornene/hexene terpolymers.

The AO/CO preferably has a density of between about 0.91 and about 1.2 g/cm$^3$, such as between about 0.920 and about 1.15 g/cm$^3$, or between about 0.940 and about 1.10 g/cm$^3$, or between about 0.950 and about 1.05 g/cm$^3$, or between about 0.98 and about 1.03 g/cm$^3$. The AO/CO preferably has a melt index of between about 0.05 and about 2 g/10 minutes, such as between about 0.1 and about 1.5 g/10 minutes, or between about 0.2 and about 1.3 g/10 minutes, or between about 0.50 and about 1 g/10 minutes. Further, the AO/CO can have a melt index less than about 2 g/10 minutes, such as less than about 1.5 g/10 minutes, or less than about 1.2 g/10 minutes, or less than about 1 g/10 minutes, and more preferably has a melt index of about 1 g/10 minutes, or about 0.5 g/10 minutes.

Films of the invention preferably are multilayer films. Also as a matter of preference, films of the invention are heat shrinkable films. Yet additionally, films of the invention preferably are useful in providing low shrink tension or low shrink force, as well as high free shrink.

With reference to their multilayer configuration, films of the invention may be palindromic films and/or coextruded films.

Further as to their multilayer configuration, films of the invention are typically of three or more layers. Preferably, films of the invention comprise at least one core layer disposed between two outer layers. The two outer layers can be identical, or can differ from each other in composition (such as the difference created by the presence or amount of a blend of two or more resins), one or more physical properties, amount or type of additives, degree of crosslinking, thickness, or the like. Where there are two or more core layers, they can be identical or can differ in like manner.

Optionally, one or more additional layers can be disposed during extrusion within the film structure, e.g. between the at least one core layer and one of the outer layers of a three layer film (thus providing a film of four or more layers), or between the core layer and an intermediate layer, or between an intermediate layer and an outer layer of a five layer film (thus providing a film of six or more layers).

For instance, in addition to at least one core layer and two outer layers, there may be two or more intermediate layers. In this regard, there can be a first set of intermediate layers—the at least one core layer accordingly being disposed between these two intermediate layers, with each of these two intermediate layers thus being disposed between the at least one core layer and an outer layer. These two intermediate layers can be identical, or can differ from each other in composition (such as the difference created by the presence or amount of a blend of two or more resins), one or more physical properties, amount or type of additives, degree of crosslinking, thickness, or the like.

And in addition to the first set of intermediate layers, situated outwardly from this first set, toward the outer layers, there can be one or more successive sets of intermediate layers—e.g., a second set of intermediate layers, a third set of intermediate layers, and so on. As with the first set of intermediate layers, the two layers of each subsequent set correspondingly can be identical or can differ.

In films of the invention, the core layer (or at least one core layer, if there are two or more core layers), is an AO/CO layer—i.e., includes AO/CO therein—and/or one or more intermediate layers are AO/CO layers. The AO/CO can comprise, or consist of, or consist essentially of, 100% by weight of the layer in which it is present, or it may be present in a blend with another thermoplastic homopolymer or copolymer, or in films having additional layers.

Preferably, the AO/CO comprises at least about 60 percent by weight, or at least about 65 percent by weight, or at least about 70 percent by weight, or at least about 75 percent by weight, or at least about 80 percent by weight, or at least about 85 percent by weight, or at least about 90 percent by weight, or at least about 95 percent by weight, of an AO/CO layer—i.e., a layer in which AO/CO is present. In the case of blends, the other polymer must be selected to be compatible with AO/CO so as to maintain the requisite mechanical and especially optical qualities of the inventive films. Especially suitable for blending are thermoplastic styrenic rubbers, especially styrene/butadiene block copolymers, styrene/ethylene/butylene block terpolymers such as Styroflex™ resins, ethylene/propylene/diene terpolymers, and AO/CO resins having a glass transition temperature of from about 50° C. to about 85° C., or from about 55° C. to about 85° C., or from about 60° C. to about 85° C.

The AO/CO layer or layers can comprise at least about 30%, such as at least about 40%, or at least about 50%, or at least about 60%, of the film thickness. Further, the AO/CO layer or layers can comprise between about 30% and about 80%, such as between about 40% and about 80%, or between about 40% and about 70%, or between about 45% and about 60%, of the film thickness.

Each of the outer layers preferably comprises, or consists of, or consists essentially of, at least one olefinic polymer. Suitable olefinic polymers include ethylene/alpha olefin copolymers, ethylene/vinyl acetate copolymers, ethylene/alkyl acrylate copolymers, ethylene/acrylic acid copolymers, ionomers, propylene homopolymers, propylene copolymers, butylene homopolymers, butylene copolymers, low density polyethylenes, high density polyethylenes, and multicomponent ethylene/alpha-olefin interpenetrating network resins. As a matter of particular preference, each of the outer layers comprises olefinic polymers selected from the group consisting of blends of a propylene homopolymer and a propylene/ethylene copolymer, blends of high density polyethylene and ethylene/vinyl acetate copolymer, and blends of high density polyethylene and low density polyethylene.

The core layer (or at least one core layer, if there are two or more core layers), and/or one or more intermediate layers, can comprise, or consist of, or consist essentially of, at least one ethylene copolymer having a melt index less than about 2 g/10 minutes, preferably less than about 1.5 g/10 minutes, such as about 1 g/10 minutes. More preferably the melt index is less than about 1 g/10 minutes, such as about 0.5 g/10 minutes. The melt index may be from about 0.4 to about 1 g/10 minutes, more preferably from about 0.5 to about 0.8 g/10 minutes. Materials suitable as these ethylene copolymers include ethylene/alpha-olefin copolymers having a density of less than about 0.916 grams/cubic centimeter, ethylene/vinyl acetate copolymers, ethylene/propylene/diene terpolymers, very low density polyethylenes, blends of very low density polyethylene and ethylene/vinyl acetate copolymer, blends of very low density polyethylene and linear low density polyethylene, and multicomponent ethylene/alpha-olefin interpenetrating network resins.

Two layer films are also within the scope of the invention. As to these films, one of the layers is an AO/CO layer, as discussed herein, and the other has the composition of an outer layer, also as discussed herein.

Final film thicknesses can be varied, depending on process, end use application, etc. Typical thicknesses range from about 0.1 to about 5 mils, such as about 0.2 to about 2 mils, or about 0.3 to about 1.5 mils, or about 0.4 to about 1 mils, or about 0.5 to about 0.8 mils, or about 0.75 mil.

Films of the invention preferably exhibit a free shrink at a temperature of 200° F. of at least about 10%, such as about 15%, or at least about 18%, or at least about 20%, such as about 20%, or at least about 25%, such as about 25%, in either or both the longitudinal and transverse directions. As a matter of particular preference, films of the invention exhibit a free shrink at a temperature of 240° F. of at least about 10%, such as at least about 15%, or at least about 20%, or at least about 30%, or at least about 40%, or at least about 45%, or at least about 50%, or at least about 60%, or at least about 70%, in either or both of the longitudinal and transverse directions. Preferred ranges for free shrink at a temperature of 240° F. are between about 10% and about 80%, such as between about 20% and about 80%, or between about 30% and about 80%, or between about 40% and about 80%, or between about 40% and about 75%, in either or both of the longitudinal and transverse directions. Further, free shrink at a temperature of 240° F. may be between about 45% and about 73% in either or both of the longitudinal and transverse directions, such as between about 49% and about 72% in either or both the longitudinal and transverse directions.

Films of the invention preferably exhibit a shrink tension at a temperature of 240° F. of between about 50 and about 400 psi, such as between about 50 and about 350 psi, or between about 50 and about 300 psi, or between about 100 and about 250 psi, in either or both of the longitudinal and transverse directions. As a matter of particular preference, films of the invention exhibit a shrink tension at a temperature of 240° F. of less than about 400 psi, such as less than about 300 psi, or less than about 250 psi, in either or both of the longitudinal and transverse directions.

Films of the invention preferably exhibit a shrink force at a temperature of 240° F. of between about 20 and about 180 grams, such as between about 20 and about 150 grams, or between about 50 and about 100 grams, in either or both of the longitudinal and transverse directions. As a matter of particular preference, films of the invention exhibit a shrink force at a temperature of 240° F. of less than about 180 grams, such as less than about 150 grams, or less than about 100 grams, in either or both of the longitudinal and transverse directions.

Films of this invention preferably exhibit a Young's modulus value of at least about 50,000 psi in either or both of the longitudinal directions, such as at least about 60,000 psi, or at least about 70,000 psi, or at least about 80,000 psi, or at least about 90,000 psi, or at least about 100,000 psi, or at least about 110,000 psi, or at least about 115,000 psi, or at least about 120,000 psi, or at least about 130,000 psi, or at least about 135,000 psi, or at least about 140,000 psi, or at least about 150,000 psi.

As a matter of particular preference, films of the invention have a Young's modulus value of between about 50,000 and about 250,000 psi, such as between about 50,000 and about 200,000 psi, or between about 70,000 and about 130,000 psi, in at least one of the longitudinal and transverse directions.

Films of the invention preferably have high impact resistance. Films of this invention preferably exhibit an instrumented impact peak load value of higher than about 45 Newtons/mil, or higher than about 50 Newtons/mil, or higher than about 55 Newtons/mil, or higher than about 60 Newtons/mil, such as about 70 Newtons/mil, or about 75 Newtons/mil, or about 80 Newtons/mil, or about 90 Newtons/mil, or about 95 Newtons/mil. Instrumented impact peak load values are in accordance with ASTM D 3763-95a; this test method is incorporated herein in its entirety, by reference thereto. Values per mil are calculated by normalizing peak load value to gauge.

Films of the invention may be used in wrapping and packaging of materials subject to distortion by a heat shrinkable film, such as textiles, e.g., sheets, and stationary. With many end uses, elastic recovery of the film is an important property.

Elastic recovery pertains to the film's propensity for resuming its shape after deformation, particularly indentation. For instance, where the film is dimpled by pressure—such as by poking and prodding—but recovers its original substantially planar shape within the requisite period of time, the film is exhibiting appropriate elastic recovery. Such recovery assists the packaging film in providing a mirror-like appearance, important to articles packaged therein for display.

Elastic recovery is significant particularly with film wrapped or packaged textiles, etc. displayed for consumer inspection and purchase. Handling by shoppers causes various stresses and distortions in the covering film; if it doesn't tighten back up thereafter, the product—or at least its wrapping or packaging film—begins to look shopworn.

The glass transition temperature of the AO/CO film component has a significant effect on the elastic recovery of the multilayer film. However, other properties of the AO/CO, and properties of other polymers in the film, as well as film processing, also affect elastic recovery, as do properties of both AO/CO and non-AO/CO layers. These relevant properties include the presence and degree of crystallinity, the presence and degree of crosslinking, molecular weights of the polymers, degree of orientation, heat treatment, and thicknesses of the individual film layers.

Elastic recovery can be measured as a percentage over a specified length of time, which can be referred to as the recovery period. Percent elastic recovery for a particular film is determined in accordance with ASTM D 5459-95—this test method being incorporated herein in its entirety, by reference thereto—employing the procedure as follows: a machine direction specimen of the film, having the dimensions 1 inch by 5 inches, is elongated to 150% of the original length (50% elongation) at 5 inches per minute, then slackened; the slackened film is held for the designated recovery period in clamps; then the film is re-elongated to determine the final sample length after recovery, taken as the sample length at the onset of tension.

Percent elastic recovery (% ER) is calculated according to the equation $$\% ER = 100[(1+EL)L_0 - L_1]/[(EL)L_0]$$

where

EL=fractional elongation $L_0$=initial sample length $L_1$=final sample length (onset of tension) after recovery Films of the invention preferably have a percent elastic recovery of at least about 30%, more preferably of at least about 40%, and still more preferably of at least about 50%, over a 15 minute recovery period. Also as a matter of preference, films of the invention preferably have a percent elastic recovery of at least about 40%, more preferably of at least about 50%, and still more preferably of at least about 60%, over a 60 minute recovery period.

Films of the invention preferably have a haze value of between about 0.1 and about 6, such as between about 0.1 and about 5, or between about 0.1 and about 4, or between about 0.1 and about 3, or between about 0.1 and about 2.5, or between about 0.1 and about 2. Films of the invention can have a haze value of less than about 6, about 5 or less than about 5, about 4 or less than about 4, about 3.5 or less than about 3.5, about 3 or less than about 3, about 2.5 or less than about 2.5, about 2 or less than about 2, about 1.5, or about 1.

Films of the invention, as well as the comparative films, can be made by downward coextrusion by techniques well known in the art as well as horizontally cast coextrusion, or "flat cast" techniques. The films can be quenched using chilled water or chilled metal rolls to provide a relatively thick primary sheet or "tape". Films can optionally be irradiated by electron beam irradiation, e.g. at a dosage of between about 30 and about 250 kiloGrays. The primary sheets or tapes are reheated to their orientation temperature, and then stretched by a trapped bubble process or a tenter frame process; this temperature is preferably at least about 20° C., more preferably at least about 40° C., greater than the glass transition temperature of the alpha-olefin/cyclic olefin copolymer. Films are stretched at any suitable ratio, e.g. about 3:1 to about 7:1, or about 4:1, or about 5:1, in each of the longitudinal and transverse directions. In the case of the tenter process, simultaneous biaxial orientation is preferred over sequential orientation.

Where films are made by downward coextrusion, the melt strength of the extrudate becomes a significant issue. This limitation is believed to result from the narrow molecular weight distribution of the AO/CO and the amorphous nature of the resin. In this case, films comprising an AO/CO with a melt index of less than about 2 g/10 minutes, such as less than about 1.5 g/10 minutes, and especially less than about 1 g/10 minutes, are preferred. The melt strength of the film, and therefore the melt index of the AO/CO, is less significant in flat cast film production. Films of the invention preferably do not exceed such thickness as to become optically inferior or exhibit excessive tension during the heat shrinking step of a particular packaging operation in which the film is used.

Films of the invention may be oriented, for example, as solid state oriented films.

Films of the invention can be stretch oriented at stretching ratios such as at least about 3:1, at least about 3.25:1, at least about 3.5:1, at least about 4:1, at least about 4.5:1, at least about 4.8:1, at least about 5:1, at least about 6:1, at least about 6.5:1, or at least about 7:1 in either or both of the longitudinal and transverse directions. Ranges for stretch orientation ratio products, reported as the stretch ratio in the longitudinal direction multiplied by the stretch ratio in the transverse direction are preferably between about 9 and about 56, such as between about 12 and 42, between about 15 and 30, or between about 20 and 25, such as about 23, or about 25. Ranges for orientation ratios are preferably between about 3:1 and about 8:1 in either or both of the longitudinal and transverse directions, and such as between about 4:1 and about 7:1 in both the longitudinal and transverse directions, or such as between about 5:1 and about 6:1 in both the longitudinal and transverse directions.

Although not required to carry out this invention, the films of the invention may be crosslinked, such as by chemical means or by irradiation, especially by electron beam irradiation at a dosage of preferably between about 20 and about 250 kiloGray, such as between about 40 and about 225 kiloGray, or between about 50 and about 200 kiloGray, or between about 75 and about 150 kiloGray. Although the films of the invention do not have to be irradiated, in one embodiment, irradiation can be used to improve processing and end-use performance of the film. Crosslinking may be enhanced by incorporating a crosslinking promoter, such as ethylene/propylene/diene terpolymer, into one or more film layers, in the manner disclosed in U.S. Pat. No. 5,993,922. The crosslink promoter may be added to either the skin layers, the core layer, and/or the substrate layers.

Referring to FIG. 1, a film 10 comprises a core layer 1, a first outer layer 2, and a second outer layer 3. Outer layers 2 and 3 can be surface or skin layers.

Core layer 1 comprises an AO/CO. Core layer 1 comprises in one embodiment at least about 30%, such as at least about 40%, or at least about 50%, of the total thickness of film 10. Core layer 1 preferably comprises between about 30% and about 80%, such as between about 30% and about 70%, or between about 40% and about 80%, or between about 42% and about 68%, or between about 45% and about 60%, of the film thickness.

First and second outer layers 2 and 3 each comprise an olefinic polymer such as ethylene/alpha olefin copolymer, homogeneous ethylene/alpha olefin copolymer, ethylene/vinyl acetate copolymer(EVA), ethylene/alkyl acrylate copolymer, ethylene/acrylic acid copolymer, ionomer, propylene homopolymer and copolymer, butylene polymer and copolymer, multi-component ethylene/alpha-olefin interpenetrating network resin, a blend of a propylene homopolymer and a propylene/ethylene copolymer, high density polyethylene, a blend of high density polyethylene and ethylene/vinyl acetate copolymer, a blend of high density polyethylene and low density polyethylene; or a blend of any of these materials. For example, layers 2 and 3 can each comprise a blend of LLDPE and EVA. The ethylene/alpha-olefin copolymer can have a density of between about 0.86 and about 0.96, such as between about 0.89 and about 0.94, or between about 0.90 and about 0.93, or between about 0.900 and about 0.915 grams/cubic centimeter. Outer layers 2 and 3 can be identical, or can differ from each other in composition (such as the difference created by the presence or amount of a blend of two or more resins), one or more physical properties, amount or type of additives, degree of crosslinking, thickness, or the like. For example, layer 2 can comprise a blend of a propylene homopolymer and a propylene/ethylene copolymer, while layer 3 can comprise a propylene/ethylene copolymer. As another example, layer 2 can comprise a propylene/ethylene copolymer, while layer 3 can comprise an ethylene/alpha-olefin copolymer. Outer layers 2 and 3 can, in one embodiment, each comprise between about 15% and about 25% of the total thickness of film 10.

Film structures in accordance with the invention can thus be depicted as A/B/A or as A/B/C, where A, B, and C each represent a distinct layer of a multilayer film.

Figure 2:
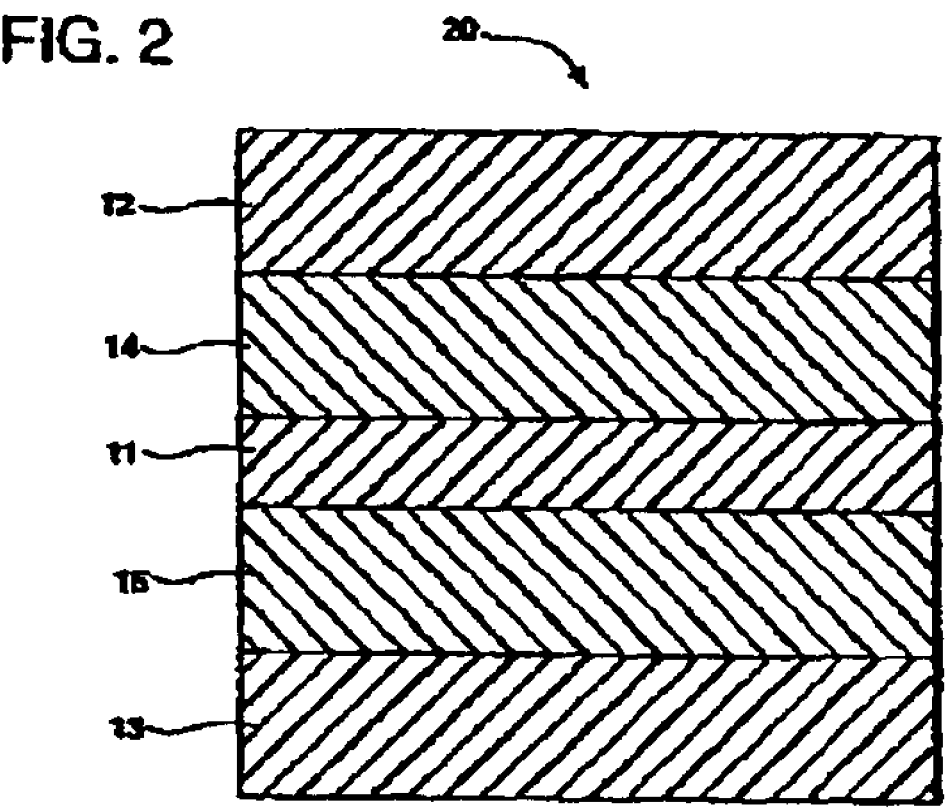
FIG. 2 is a cross-sectional view of a five layer film.

In an alternative embodiment (see FIG. 2), a film 20 comprises a core layer 11, first outer layer 12, second outer layer 13, first intermediate layer 14, and second intermediate layer 15.

The core layer 11, and outer layers 12 and 13, can comprise any of the materials disclosed above for layers 1, 2 and 3 respectively of FIG. 1.

Each of intermediate layers 14 and 15 comprises an ethylene copolymer having a melt index less than about 2 g/10 minutes, preferably less than about 1.5 g/10 minutes, such as about 1 g/10 minutes. More preferably the melt index is less than about 1 g/10 minutes, such as about 0.5 g/10 minutes. The melt index may be from about 0.4 to about 1 g/10 minutes, more preferably from about 0.5 to about 0.8 g/10 minutes. Suitable examples of these ethylene copolymers include ethylene/alpha-olefin copolymers having a density of less than about 0.916 grams/cubic centimeter, ethylene/vinyl acetate copolymers, ethylene/propylene/diene terpolymers, very low density polyethylenes, blends of very low density polyethylene and ethylene/vinyl acetate copolymer, blends of very low density polyethylene and linear low density polyethylene, and multicomponent ethylene/alpha-olefin interpenetrating network resins.

In one embodiment, the core layer 11 comprises between about 40% and about 60%, such as between about 42% and about 58%, or between about 45% and about 55%, of the total thickness of film 20; outer layers 2 and 3 each comprise between about 5% and about 10% of the total thickness of film 20; and intermediate layers 14 and 15 each comprise between about 10% and about 25%, such as between about 15% and about 20%, of the total thickness of film 20.

In a second alternative embodiment (see FIG. 2), a film 20 comprises a core layer 11, first outer layer 12, second outer layer 13, first intermediate layer 14, and second intermediate layer 15. The core layer 11 can comprise any of the materials disclosed above for layers 14 and 15 of the first embodiment of FIG. 2. Thus, core layer 11 of this second alternative embodiment can comprise an ethylene copolymer having a melt index less than 2, preferably less than 1.5, more preferably about 1 g/10 minutes. Outer layers 12 and 13 can comprise any of the materials disclosed for layers 2 and 3 respectively of FIG. 1, and for layers 12 and 13 of the first alternative embodiment of FIG. 2. Thus, core layer 11 of this second alternative embodiment can comprise an acyclic polyolefin having a melt index less than 2 g/10 minutes. Intermediate layers 14 and 15 can comprise any of the materials disclosed for layer 1 of FIG. 1, and for layer 11 of the first alternative embodiment of FIG. 2. Thus, intermediate layers 14 and 15 of this second alternative embodiment can comprise an AO/CO. In one embodiment, the core layer 11 comprises between about 20% and about 50%, such as between about 30% and about 40%, of the total thickness of film 20; outer layers 12 and 13 each comprise between about 5% and about 10% of the total thickness of film 20; and intermediate layers 14 and 15 each comprise between about 20% and about 35%, such as between about 24% and about 30%, of the total thickness of film 20.

The invention is illustrated by the following procedures. These are provided for the purpose of representation, and are not to be construed as limiting the scope of the invention.

Experimental Procedures

Materials Employed in the Procedures

The materials used in the Examples and the Comparative Examples are listed in Table 1.

TABLE 1

| Material Code | Tradename or Designation | Source(s) |
|---|---|---|
| A1 | Eltex P KS 409 | Solvay |
| A2 | PD 9302 | Exxon |
| A3 | Dowlex 2045.04 | Dow |
| A4 | Elvax 3128 | DuPont |
| A5 | PE 1335 | Rexene |
| A6 | Dowlex 2037 | Dow |
| A7 | Affinity PL 1280 | Dow |
| A8 | — | W.R. Grace |
| A9 | — | W.R. Grace |
| A10 | — | W.R. Grace |
| A11 | — | W.R. Grace |
| A12 | Blend of A3, A5, and A6 | Dow and Rexene |
| A13 | Blend of A3, A5, and A6 | Dow and Rexene |
| A14 | Topas 9503-x1T4 | Celanese |
| A15 | Topas 8007 | Celanese |
| A16 | XU 61905.32 | DOW |
| A17 | ESCORENE ™ LD-705.16 | Exxon |
| A18 | SP1903 ™ | Eastman |
| A19 | — | Celanese |
| A20 | — | Celanese |
| A21 | XU 59900.48 | Dow |

A1 is a propylene/ethylene copolymer with an ethylene content of 3.2% by weight of the copolymer, a melting point of 134° C., and a melt index of 5.0 to 6.0 g/10 min.

A2 is a propylene/ethylene copolymer with an ethylene content of 3.3% by weight of the copolymer, a melting point of 139° C., and a melt index of 3.8 g/10 min.

A3 is an ethylene/octene copolymer, a LLDPE, with an octene content of 6.5% by weight of the copolymer, a density of 0.920 g/cm$^3$, a melting point of 124° C., a melt index of 1 g/10 min, and high antioxidant loading.

A4 is an ethylene/vinyl acetate copolymer, with a vinyl acetate content of 8.8% by weight of the copolymer, a density of 0.928 g/cm$^3$, and a melt index of 2 g/10 min.

A5 is an ethylene/vinyl acetate resin, with a vinyl acetate content of 3.3% by weight of the copolymer, a density of 0.924 g/cm$^3$, and a melt index of 2 g/10 min.

A6 is an ethylene/octene copolymer, a LLDPE, with an octene content of 2.5% by weight of the copolymer, a density of 0.935 g/cm$^3$, and a melt index of 2.5 g/10 min.

A7 is a single-site catalyzed ethylene/octane co-polymer, with an octene content of 13% by weight of the copolymer, a density of 0.900 g/cm$^3$, and a melt index of 6.0 g/10 min.

A8 is an amorphous ethylene/norbornene copolymer, with a norbornene content of 35 mole % of the copolymer, a glass transition temperature of 69° C., and a melt index of 1.3 g/10 min.

A9 is an amorphous ethylene/norbornene copolymer, with a norbornene content of 14 mole % of the copolymer, a glass transition temperature of 13° C., and a melt index of 0.45 g/10 min.

A10 is an amorphous ethylene/norbornene copolymer, with a norbornene content of 23.7 mole % of the copolymer, a glass transition temperature of 42.1° C., and a melt index of 1.06 g/10 min.

A11 is an amorphous ethylene/norbornene copolymer, with a norbornene content of 25 mole % of the copolymer, a glass transition temperature of 36.5° C., and a melt index of 1.22 g/10 min.

A12 is a blend of 25% by weight A5, 50% by weight A3, and 25% by weight A6.

A13 is a blend of 25% by weight A5 (including additives), 50% by weight A3, and 25% by weight A6.

A14 is an ethylene/norbornene copolymer having 23 mol % norbornene, Tg of 33° C., and a melt index of 1.08 g/10 min.

A15 is an ethylene/norbornene copolymer having about 35 mol % norbornene, a glass transition of about 85° C., and a melt index of about 4 g/10 min.

A16 is an ethylene/1-octene copolymer with a density of 0.911 grams/cc, a melt index of 0.5 g/10 min, and a 1-octene content of 9% by weight of the copolymer.

A17 is an ethylene/vinyl acetate copolymer with a melt index of 0.40 g/10 min and a vinyl acetate content of 13.3% by weight of the copolymer.

A18 is an ethylene/butyl acrylate copolymer with a density of 0.93 grams/cc, a melt index of 0.45 g/10 min, and a butyl acrylate content of 18% by weight of the copolymer.

A19 is an ethylene/norbornene copolymer having 23 mol % norbornene, Tg of 33° C., and a melt index of 0.75 g/10 min.

A20 is an ethylene/norbornene copolymer having 25 mol % norbornene, Tg of 40° C. and a melt index of 0.75 g/10 min.

A21 is an interpenetrating network resin with a density of 0.925 grams/cc, and a melt index of 0.88 g/10 min.

Preparation of the Films

The films of Examples 1–8, and of Comparative Examples 1–7—each having a core layer, and two outer layers of the same composition—were prepared employing the film formulations and processing conditions set forth in Table 2, in accordance with the following procedure.

With Comparative Example 1 and Comparative Example 2, for which extrusion was employed, the three layer sheet was produced by flat casting a three layer extrudate, onto a chilled polished roll for quenching. In the case of Examples 1–8 and Comparative Examples 3–7—these Examples and Comparative Examples utilizing lamination—the laminated sheet was produced by flat casting the three individual layers, and heat laminating the components in a heated platen press.

Whether produced by extrusion or lamination, the resulting sheet was heated, using hot air, to its orientation temperature as indicated in Table 2. Where radiation was employed, then prior to the heating the sheet was irradiated to the level of the indicated dose.

After this treatment, the extruded sheet samples were oriented by the trapped bubble method, and the laminated sheet samples were oriented by stretching on a laboratory film stretcher, at the indicated orientation ratios in the longitudinal and transverse directions, then immediately cooled.

The films of Examples 9–16 likewise were prepared employing the film formulations and processing conditions set forth in Table 2, in accordance with the following procedure. Three or five extruders—for producing films of three or five layers, respectively—were employed to deliver an annular extrudate, which was downwardly cast and cooled to a solid state to provide an 18.75 mil thick cylindrical sheet. The cylindrical sheet was flattened into a doubled ribbon, or primary tape, conveyed through an irradiation chamber, then conveyed to a reheating station, where the tape was immediately heated using hot air. The tape then was stretched in the transverse direction (TD) by passing over an air bubble held between two rotating nip rolls (trapped bubble), while being simultaneously stretched in the longitudinal direction (LD) by the differential speed between the two sets of nip rolls containing the bubble. The resulting oriented film was cooled in the stretched state to provide a palindromic three or five layer film.

TABLE 2

| Designation | Layer Thickness Ratio, Total Thickness | Outer Layer Comp. | Intermed. Layer Comp. | Core Layer Comp. | Tape Preparation | Orientation Temperature | Orientation Ratios | Radiation Dose (kGray) |
|---|---|---|---|---|---|---|---|---|
| Comp. Ex. 1 | 1/1/1; 1 mil | A12 | — | A8 | Extrusion | 250° F. | LD - 4.8:1<br>TD - 4.8:1 | 40 |
| Comp. Ex. 2 | 1/2/1; 1 mil | A12 | — | A3 | Extrusion | 230° F. | LD - 4.8:1<br>TD - 4.8:1 | 40 |
| Ex. 1 | 1/1/1; 1.3 mil | A1 | — | A9 | Lamination | 230° F. | LD - 4:1<br>TD - 4:1 | — |
| Ex. 2 | 1/1/1; 0.9 mil | A1 | — | A11 | Lamination | 230° F. | LD - 4:1<br>TD - 4:1 | — |
| Comp. Ex. 3 | 1/1/1; 1.0 mil | A1 | — | A3 | Lamination | 230° F. | LD - 4:1<br>TD - 4:1 | — |
| Ex. 3 | 1/1/1; 0.6 mil | A1 | — | A11 | Lamination | 230° F. | LD - 5:1<br>TD - 5:1 | — |
| Comp. Ex. 4 | 1/1/1; 0.6 mil | A1 | — | A3 | Lamination | 230° F. | LD - 5:1<br>TD - 5:1 | — |
| Ex. 4 | 1/1/1; 0.7 mil | A13 | — | A11 | Lamination | 230° F. | LD - 5:1<br>TD - 5:1 | 67 |
| Ex. 5 | 1/1/1; 1.1 mil | A7 | — | A10 | Lamination | 190° F. | LD - 4:1<br>TD - 4:1 | 35 |
| Ex. 6 | 1/1/1; 1.1 mil | A4 | — | A10 | Lamination | 190° F. | LD - 4:1<br>TD - 4:1 | 35 |
| EX. 7 | 1/2/1; 0.7 mil | A2 | — | A11 | Lamination | 250° F. | LD - 5:1<br>TD - 5:1 | — |
| Comp. Ex. 5 | 1/2/1; 0.7 mil | A2 | — | A8 | Lamination | 250° F. | LD - 5:1<br>TD - 5:1 | — |
| Comp. Ex. 6 | 1/2/1; 0.6 mil | A2 | — | A3 | Lamination | 250° F. | LD - 5:1<br>TD - 5:1 | — |
| Ex. 8 | 1/2/1; 0.6 mil | A2 | — | A11 | Lamination | 240° F. | LD - 5:1<br>TD - 5:1 | — |
| Comp. Ex. 7 | 1/2/1; 0.6 mil | A2 | — | A3 | Lamination | 240° F. | LD - 5:1<br>TD - 5:1 | — |
| Ex. 9 | 10/20/40/20/10; 0.80 mil | A13 | A16 | A14 | Coextrusion | 230° F. | LD - 5:1<br>TD - 5:1 | 49 |
| Comp. Ex. 8 | 1/3/1 | A13 | — | A17 + A18 | Coextrusion | — | LD - 5:1<br>TD - 5:1 | — |
| Comp. Ex. 9 | Mono-ply PVC Reynolon 5044 0.7 mils | | | | | | | |
| Ex. 10 | 10/15/50/15/10; 0.80 mil | A13 | A16 | A14 | Coextrusion | 230° F. | LD - 5:1<br>TD - 5:1 | 49 |
| Ex. 11 | 20/60/20; 0.60 mil | A13 | — | A14 | Coextrusion | 230° F. | LD - 5:1<br>TD - 5:1 | 50 |
| Ex. 12 | 20/60/20; 0.60 mil | A16 + A3[1] | — | A19 | Coextrusion | 230° F. | LD - 5:1<br>TD - 5:1 | 50 |
| Ex. 13 | 20/60/20; 1.00 mil | A16 + A3[1] | — | A20 | Coextrusion | 230° F. | LD - 5:1<br>TD - 5:1 | 50 |
| Ex. 14 | 5/20/50/20/5; 1.00 mil | A1 | A16 | A20 | Coextrusion | 230° F. | LD - 5:1<br>TD - 5:1 | 50 |
| Ex. 15 | 10/15/50/15/10; 0.80 mil | A21 | A16 | A19 | Coextrusion | 230° F. | LD - 5:1<br>TD - 5:1 | 49 |
| Ex. 16 | 10/15/50/15/10; 0.80 mil | A13 | A16 | A19 + A15[2] | Coextrusion | 230° F. | LD - 5:1<br>TD - 5:1 | 50 |

[1] 67 wt % A16 + 33 wt % A3
[2] 90 wt % A19 + 10 wt % A15

The films listed in Table 3 were tested for the properties identified in this Table. The results of these tests also are set forth in Table 3; unless stated otherwise, these are LD values.

Particularly as to Examples 1–8 and Comparative Examples 1–7, testing for shrink tension was conducted according to ASTM 2838, except as follows: a 2.8 inch by 1 inch test strip (2.8 inches is the distance between the jaws of the strain gauge) was immersed in an oil bath (Dow Corning 200 silicone oil, 20 centistroke) preheated to 100° F. [38° C.] which was thereafter heated at a rate of approximately 10° F. per minute to about 300° F., or to the melting point of the specimen, while restraining the immersed specimen in the jaws of a strain gauge. Strain force was measured continuously and reported at 10° increments and converted to psi by use of the initial thickness of the one-inch test strip.

of the invention, because it demonstrates the new PVC-like combination of modulus and shrink properties resulting from using A11, an ethylene/norbornene copolymer having a moderate glass transition temperature (36.5° C.), significantly higher than room temperature but significantly lower than the orientation temperature.

A comparison of the test results for the films of Example 7 and Comparative Example 6 further demonstrates how very high modulus and very low shrink tension are obtained

TABLE 3

| Sample | Modulus (psi) | Peak Shrink Tension (psi) | Impact Strength (N/mil) | Haze | Free Shrink (%) @185° F. | Free Shrink (%) @200° F. | Free Shrink (%) @220° F. | Free Shrink (%) @240° F. |
|---|---|---|---|---|---|---|---|---|
| Comp. Ex. 1 | | | | | | | | |
| LD | 172,820 | | | | | | | |
| TD | 163,000 | | | | | | | |
| Comp. Ex. 2 | | | | | | | | |
| LD | 46,390 | | | | | | | |
| TD | 67,650 | | | | | | | |
| Ex. 1 | 66,533 | 281 | | | 11 | 18 | 30 | |
| Ex. 2 | 138,330 | 262 | | | 10 | 18 | 28 | |
| Comp. Ex. 3 | 89,286 | 389 | | | 9 | 15 | 28 | |
| Ex. 7 | 201,372 | 245 | | | | | | |
| Comp. Ex. 5 | 172,933 | 461 | | | 7 | 22 | 33 | |
| Comp. Ex. 6 | 115,082 | 338 | | | 6 | 10 | 17 | |
| Ex. 8 | 162,000 | 349 | | | | | | |
| Comp. Ex. 7 | 104,998 | 446 | | | | | | |
| Ex. 9 | | | | | | | | |
| LD | 92,900 | 374 | 103 | 2.8 | | 22 | 43 | 71 |
| TD | 92,600 | 365 | | | | 30 | 52 | 73 |
| Comp. Ex. 8 | | | | | | | | |
| LD | 33,408 | 337 | 75 | 5.1 | 24 | 43 | 48 | 73 |
| TD | 25,239 | 263 | | | 27 | 42 | 49 | 72 |
| Comp. Ex. 9 | | | | | | | | |
| LD | 195,401 | 220 | 45 | 4.1 | 22 | 25 | 27 | |
| TD | 143,809 | 162 | | | 24 | 33 | 33 | |

The test results for the films of Comparative Example 1 and Comparative Example 2, both having crosslinked, mixed ethylene copolymer outer layers, show the much higher modulus obtained from the use of an ethylene/norbornene core layer in place of LLDPE. Also, it was found that 250° F. was the lowest orientation temperature possible for this film at the chosen orientation ratios (LD—4.8:1; TD—4.8:1), even in the absence of cooling during stretching in the laboratory film stretcher (none of the samples cited in the tables was cooled during stretching). This represents an orientation preheat temperature nearly 40° C. higher than the glass transition temperature of the ethylene/norbornene core.

A comparison of the test results for the films of Example 1 and Comparative Example 3, both having propylene copolymer outer layers, shows the low shrink tension and comparable or better free shrink properties obtained when an amorphous ethylene/norbornene layer is used instead of LLDPE. Peak shrink tension, resulting from heating the film sample in silicone oil and collecting tension data continuously until the maximum value is achieved, demonstrates that Example 1 affords a much lower tension, similar to the peak shrink tension in the LD direction for the commercial PVC shrink film (Comparative Example 11) and for a commercial polyolefin soft shrink film (Comparative Example 8). However, the modulus of the Example 1 film is still much lower than that of the PVC film. This is attributed to the relatively low glass transition temperature of the A9 ethylene/norbornene resin used to make this film. This glass transition temperature is outside the range of glass transition temperatures for the alpha-olefin/cyclic olefin copolymers of the invention. Example 2 is an example of one of the films by the use of a suitable ethylene/norbornene core. The Example 7 film employs an increased content of amorphous ENB resin, a different propylene copolymer skin, and a higher orientation temperature, but is similar to the film of Example 2.

The film of Example 9 was further tested for percent elastic recovery, using the procedure as discussed herein for determining this value. The results are shown in Table 4.

TABLE 4

| Recovery Time (minutes) | Elastic Recovery (%) |
|---|---|
| 15 | 57 |
| 60 | 65 |

It is to be understood that variations of the invention can be made without departing from the scope of the invention, which is not limited to the specific embodiments and examples disclosed herein. All references to the ASTM test methods herein are to the most recent as of the priority filing date of this patent application. All ASTM test methods cited in this patent application are incorporated by reference.

What is claimed is:

1. A film comprising:
   a) a core layer comprising at least about 65 percent by weight of a homogeneous alpha-olefin/cyclic olefin random copolymer;
   b) a first outer layer comprising an olefinic polymer; and
   c) a second outer layer comprising an olefinic polymer;

wherein the film has:
i) a Young's modulus of between about 50,000 pounds and about 200,000 pounds per square inch in at least one of the longitudinal and transverse directions;
ii) a free shrink of between about 10% and about 80% at 240° F. in at least one of the longitudinal and transverse directions; and
iii) a shrink tension of less than about 400 pounds per square inch at 240° F. in at least one of the longitudinal and transverse directions.

2. The film of claim 1 wherein the film has a haze of less than about 6.

3. The film of claim 1 wherein the homogeneous alpha-olefin/cyclic olefin random copolymer has a melt index of less than about 2 g/10 minutes.

4. The film of claim 1 wherein the core layer comprising a homogeneous alpha-olefin/cyclic olefin random copolymer comprises between about 30% and about 80% of the total film thickness.

5. The film of claim 1 wherein the homogeneous alpha-olefin/cyclic olefin random copolymer comprises a member selected from the group consisting of ethylene/norbornene copolymers and ethylene/cyclopentene copolymers.

6. The film of claim 5 wherein the homogeneous alpha-olefin/cyclic olefin random copolymer has a glass transition temperature of from about 25° C. to about 45° C.

7. The film of claim 5 wherein the homogeneous alpha-olefin/cyclic olefin random copolymer comprises an ethylene/norbornene copolymer, the ethylene/norbornene copolymer comprising from about 15 mole percent to about 30 mole percent norbornene.

8. The film of claim 1 wherein each of the first outer layer and the second outer layer comprises a material selected from the group consisting of ethylene/alpha olefin copolymers, ethylene/vinyl acetate copolymers, ethylene/alkyl acrylate copolymers, ethylene/acrylic acid copolymers, ionomers, propylene homopolymers, propylene copolymers, propylene/ethylene copolymer, butylene homopolymers, butylene copolymers, low density polyethylenes, high density polyethylenes, multicomponent ethylene/alpha-olefin interpenetrating network resins, and blends thereof.

9. A film comprising:
a) a core layer comprising at least about 65 percent by weight of a homogeneous alpha-olefin/cyclic olefin random copolymer;
b) a first intermediate layer comprising an ethylene copolymer having a melt index less than about 2 g/10 minutes;
c) a second intermediate layer comprising an ethylene copolymer having a melt index less than about 2 g/10 minutes;
d) a first outer layer comprising an olefinic polymer; and
e) a second outer layer comprising an olefinic polymer;
wherein the film has:
i) a Young's modulus of between about 50,000 pounds and about 200,000 pounds per square inch in at least one of the longitudinal and transverse directions;
ii) a free shrink of between about 10% and about 80% at 240° F. in at least one of the longitudinal and transverse directions; and
iii) a shrink tension of less than about 400 pounds per square inch at 240° F. in at least one of the longitudinal and transverse directions.

10. The film of claim 9 wherein the film has a haze of less than about 6.

11. The film of claim 9 wherein the homogeneous alpha-olefin/cyclic olefin random copolymer has a melt index of less than about 2 g/10 minutes.

12. The film of claim 9 wherein the core layer comprising a homogeneous alpha-olefin/cyclic olefin random copolymer comprises between about 30% and about 80% of the total film thickness.

13. The film of claim 9 wherein the homogeneous alpha-olefin/cyclic olefin random copolymer comprises a member selected from the group consisting of ethylene/norbornene copolymers and ethylene/cyclopentene copolymers.

14. The film of claim 13 wherein the homogeneous alpha-olefin/cyclic olefin random copolymer has a glass transition temperature of from about 25° C. to about 45° C.

15. The film of claim 13 wherein the homogeneous alpha-olefin/cyclic olefin random copolymer comprises an ethylene/norbornene copolymer, the ethylene/norbornene copolymer comprising from about 15 mole percent to about 30 mole percent norbornene.

16. The film of claim 9 wherein each of the first intermediate layer and the second intermediate layer comprises a material selected from the group consisting of ethylene/alpha-olefin copolymers having a density of less than 0.916 grams/cubic centimeter, ethylene/vinyl acetate copolymers, ethylene/propylene/diene terpolymers, very low density polyethylenes, blends of very low density polyethylene and ethylene/vinyl acetate copolymer, and multicomponent ethylene/alpha-olefin interpenetrating net-work resins.

17. The film of claim 9 wherein each of the first outer layer and the second outer layer comprises a material selected from the group consisting of ethylene/alpha olefin copolymers, ethylene/vinyl acetate copolymers, ethylene/alkyl acrylate copolymers, ethylene/acrylic acid copolymers, ionomers, propylene homopolymers, propylene copolymers, propylene/ethylene copolymer, butylene homopolymers, butylene copolymers, low density polyethylenes, high density polyethylenes, multicomponent ethylene/alpha-olefin interpenetrating network resins, and blends thereof.

18. A film comprising:
a) a core layer comprising an ethylene copolymer having a melt index less than about 2;
b) a first intermediate layer comprising at least about 65 percent by weight of a homogeneous alpha-olefin/cyclic olefin random copolymer;
c) a second intermediate layer comprising at least about 65 percent by weight of a homogeneous alpha-olefin/cyclic olefin random copolymer;
d) a first outer layer comprising an olefinic polymer; and
e) a second outer layer comprising an olefinic polymer;
wherein the film has:
i) a Young's modulus of between about 50,000 pounds and about 200,000 pounds per square inch in at least one of the longitudinal and transverse directions;
ii) a free shrink of between about 10% and about 80% at 240° F. in at least one of the longitudinal direction and transverse direction; and
iii) a shrink tension of less than about 400 pounds per square inch at 240° F. in at least one of the longitudinal and transverse directions.

19. The film of claim 18 wherein the film has a haze of less than about 6.

20. The film of claim 18 wherein the homogeneous alpha-olefin/cyclic olefin random copolymer has a melt index of less than about 2 g/10 minutes.

21. The film of claim 18 wherein the core layer comprises a material selected from the group consisting of ethylene/ alpha-olefin copolymers having a density of less than 0.916 grams/cubic centimeter, ethylene/vinyl acetate copolymers, ethylene/propylene/diene terpolymers, very low density polyethylenes, blends of very low density poly-ethylene and ethylene/vinyl acetate co-polymer, and multi-component ethylene/alpha-olefin interpenetrating network resins.

22. The film of claim 21 wherein the first and second intermediate layers together comprise between about 30% and about 80% of the total film thickness.

23. The film of claim 18 wherein the homogeneous alpha-olefin/cyclic olefin random copolymer comprises a member selected from the group consisting of ethylene/norbornene copolymers and ethylene/cyclopentene copolymers.

24. The film of claim 23 wherein the homogeneous alpha-olefin/cyclic olefin random copolymer has a glass transition temperature of from about 25° C. to about 45° C.

25. The film of claim 23 wherein the homogeneous alpha-olefin/cyclic olefin random copolymer comprises an ethylene/norbornene copolymer, the ethylene/norbornene copolymer comprising from about 15 mole percent to about 30 mole percent norbornene.

26. A film comprising:
a) a core layer comprising a homogeneous alpha-olefin/cyclic olefin random copolymer having a glass transition temperature of from about 25° C. to about 45° C.;
b) a first outer layer comprising an olefinic polymer; and
c) a second outer layer comprising an olefinic polymer;
wherein the film has:
ii) a Young's modulus of between about 50,000 pounds and about 200,000 pounds per square inch in at least one of the longitudinal and transverse directions;
ii) a free shrink of between about 10% and about 80% at 240° F. in at least one of the longitudinal and transverse directions; and
iii) a shrink tension of less than about 400 pounds per square inch at 240° F. in at least one of the longitudinal and transverse directions.

27. The film of claim 26 wherein the film has a haze of less than about 6.

28. The film of claim 26 wherein the homogeneous alpha-olefin/cyclic olefin random copolymer has a melt index of less than about 2 g/10 minutes.

29. The film of claim 26 wherein the core layer comprising a homogeneous alpha-olefin/cyclic olefin random copolymer comprises between about 30% and about 80% of the total film thickness.

30. The film of claim 26 wherein the homogeneous alpha-olefin/cyclic olefin random copolymer comprises a member selected from the group consisting of ethylene/norbornene copolymers and ethylene/cyclopentene copolymers.

31. The film of claim 30 wherein the homogeneous alpha-olefin/cyclic olefin random copolymer comprises an ethylene/norbornene copolymer, the ethylene/norbornene copolymer comprising from about 15 mole percent to about 30 mole percent norbornene.

32. The film of claim 26 wherein each of the first outer layer and the second outer layer comprises a material selected from the group consisting of ethylene/alpha olefin copolymers, ethylene/vinyl acetate copolymers, ethylene/alkyl acrylate copolymers, ethylene/acrylic acid copolymers, ionomers, propylene homopolymers, propylene copolymers, butylene homopolymers, butylene copolymers, low density polyethylenes, high density polyethylenes, multicomponent ethylene/alpha-olefin interpenetrating network resins, blends of a propylene homopolymer and a propylene/ethylene copolymer, blends of high density polyethylene and ethylene/vinyl acetate copolymer, and blends of high density polyethylene and low density polyethylene.

33. A film comprising:
a) a core layer comprising a homogeneous alpha-olefin/cyclic olefin random copolymer having a glass transition temperature of from about 25° C. to about 45° C.;
b) a first intermediate layer comprising an ethylene copolymer having a melt index less than about 2;
c) a second intermediate layer comprising an ethylene copolymer having a melt index less than about 2;
d) a first outer layer comprising an olefinic polymer; and
e) a second outer layer comprising an olefinic polymer;
wherein the film has:
i) a Young's modulus of between about 50,000 pounds and about 200,000 pounds per square inch in at least one of the longitudinal and transverse directions;
ii) a free shrink of between about 10% and about 80% at 240° F. in at least one of the longitudinal and transverse directions; and
iii) a shrink tension of less than about 400 pounds per square inch at 240° F. in at least one of the longitudinal and transverse directions.

34. The film of claim 33 wherein the film has a haze of less than about 6.

35. The film of claim 33 wherein the homogeneous alpha-olefin/cyclic olefin random copolymer has a melt index of less than about 2 g/10 minutes.

36. The film of claim 33 wherein the core layer comprising a homogeneous alpha-olefin/cyclic olefin random copolymer comprises between about 30% and about 80% of the total film thickness.

37. The film of claim 33 wherein the homogeneous alpha-olefin/cyclic olefin random copolymer comprises a member selected from the group consisting of ethylene/norbornene copolymers and ethylene/cyclopentene copolymers.

38. The film of claim 37 wherein the homogeneous alpha-olefin/cyclic olefin random copolymer comprises an ethylene/norbornene copolymer, the ethylene/norbornene copolymer comprising from about 15 mole percent to about 30 mole percent norbornene.

39. The film of claim 33 wherein each of the first intermediate layer and the second intermediate layer comprises a material selected from the group consisting of ethylene/alpha-olefin copolymers having a density of less than 0.916 grams/cubic centimeter, ethylene/vinyl acetate copolymers, ethylene/propylene/diene terpolymers, very low density polyethylenes, blends of very low density polyethylene and ethylene/vinyl acetate co-polymer, and multi-component ethylene/alpha-olefin interpenetrating net-work resins.

40. The film of claim 33 wherein each of the first outer layer and the second outer layer comprises a material selected from the group consisting of ethylene/alpha olefin copolymers, ethylene/vinyl acetate copolymers, ethylene/alkyl acrylate copolymers, ethylene/acrylic acid copolymers, ionomers, propylene homopolymers, propylene copolymers, butylene homopolymers, butylene copolymers, low density polyethylenes, high density polyethylenes, multicomponent ethylene/alpha-olefin interpenetrating network resins, blends of a propylene homopolymer and a propylene/ethylene copolymer, blends of high density polyethylene and ethylene/vinyl acetate copolymer, and blends of high density polyethylene and low density polyethylene.

41. A film comprising:
a) a core layer comprising an ethylene copolymer having a melt index less than about 2;
b) a first intermediate layer comprising a homogeneous alpha-olefin/cyclic olefin random copolymer having a glass transition temperature of from about 25° C. to about 45° C.;
c) a second intermediate layer comprising a homogeneous alpha-olefin/cyclic olefin random copolymer having a glass transition temperature of from about 25° C. to about 45° C.;
d) a first outer layer comprising an olefinic polymer; and
e) a second outer layer comprising an olefinic polymer; wherein the film has:
  i) a Young's modulus of between about 50,000 pounds and about 200,000 pounds per square inch in at least one of the longitudinal and transverse directions;
  ii) a free shrink of between about 10% and about 80% at 240° F. in at least one of the longitudinal direction and transverse direction; and
  iii) a shrink tension of less than about 400 pounds per square inch at 240° F. in at least one of the longitudinal and transverse directions.

42. The film of claim 41 wherein the film has a haze of less than about 6.

43. The film of claim 41 wherein the homogeneous alpha-olefin/cyclic olefin random copolymer has a melt index of less than about 2 g/10 minutes.

44. The film of claim 41 wherein the core layer comprises a material selected from the group consisting of ethylene/alpha-olefin copolymers having a density of less than 0.916 grams/cubic centimeter, ethylene/vinyl acetate copolymers, ethylene/propylene/diene terpolymers, very low density polyethylenes, blends of very low density poly-ethylene and ethylene/vinyl acetate co-polymer, and multi-component ethylene/alpha-olefin interpenetrating network resins.

45. The film of claim 44 wherein the first and second intermediate layers together comprise between about 30% and about 80% of the total film thickness.

46. The film of claim 41 wherein the homogeneous alpha-olefin/cyclic olefin random copolymer comprises a member selected from the group consisting of ethylene/norbornene copolymers and ethylene/cyclopentene copolymers.

47. The film of claim 46 wherein the homogeneous alpha-olefin/cyclic olefin random copolymer comprises an ethylene/norbornene copolymer, the ethylene/norbornene copolymer comprising from about 15 mole percent to about 30 mole percent norbornene.

* * * * *